Patented Dec. 30, 1952

2,624,015

UNITED STATES PATENT OFFICE 2,624,015

LOAD REGULATING SYSTEM

Seymour W. Herwald, Pittsburgh, and Harold M. Watson, Verona, Pa., assignors to Westinghouse Electric Corporation, East Pittsburgh, Pa., a corporation of Pennsylvania Application March 3, 1951, Serial No. 213,726

8 Claims. (Cl. 290—4)

This invention relates to regulating systems and in particular to a load regulator for use on an infinite bus system.

On an infinite bus system having a plurality of generators and loads electrically connected to an infinite bus the conventional turbine generators react to carry a percentage of the total system load and thus a proportionate percentage of any tie-line load peak. A sudden surge in a tie-line load momentarily increases the output of each of the generators. This increase in output from the generators affects other loads such as lighting circuits that are connected to the infinite bus and must be sufficient to supply increased losses on the infinite bus.

In order to prevent disturbances in the system, it is desirable to absorb these surge loads by means of one or more turbine generators located near the source of the peak load. A fast-acting regulator is required for this purpose, that is, one that will respond rapidly to the load requirements and cause the turbine generator to absorb the load surge before it can be felt throughout the remainder of the system. Heretofore, load regulators have been utilized for isolating surge loads to a single turbine generator, but these regulators have had a relatively slow response.

An object of this invention is the provision of a new and improved regulating system for isolating a fluctuating load to one or more generators that are connected to an infinite bus.

A further object of this invention is the provision of a load regulator which has a high speed of response.

A still further object of this invention is the provision of a load regulator which has a high speed of response for isolating a fluctuating load to one or more generators that are connected to an infinite bus.

Figure 1A:
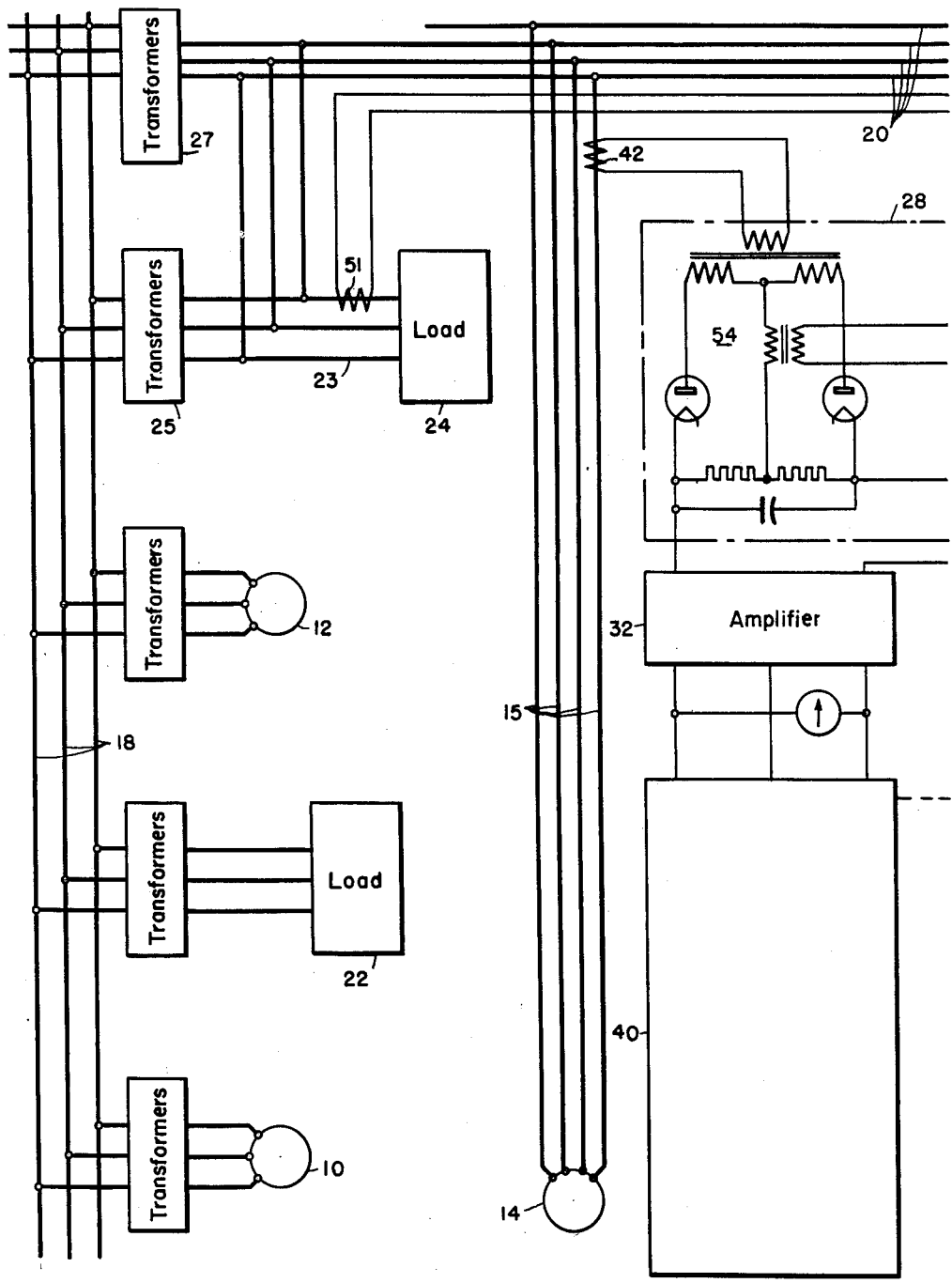
Figure 1B:
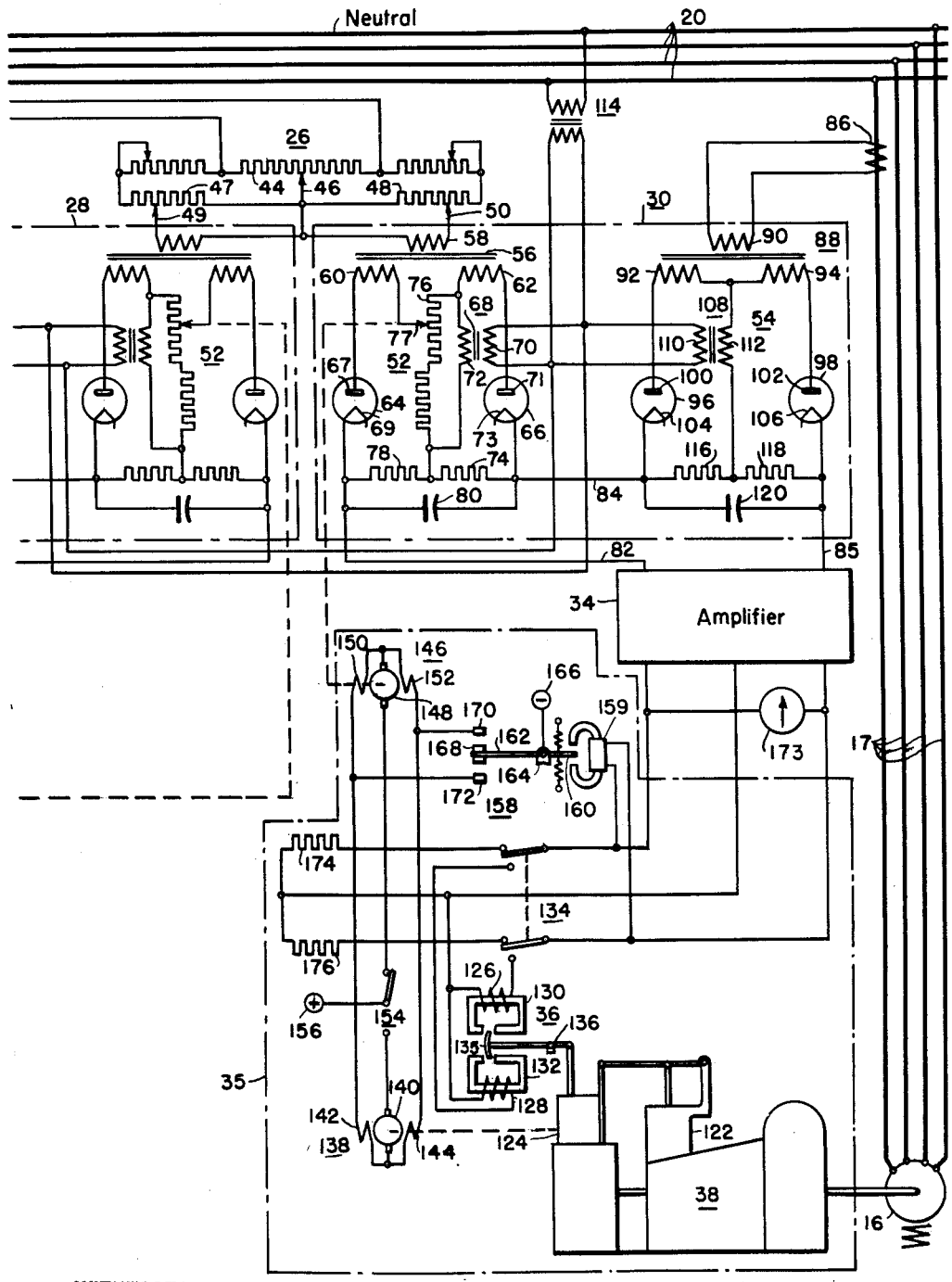

Other objects of this invention will become apparent from the following description when taken in conjunction with the accompanying drawings, in which:

Figures 1A and 1B are diagrammatic representations of apparatus and circuits embodying the teachings of this invention.

Referring to Figs. 1A and 1B of the drawings, there is illustrated a plurality of turbine generators 10, 12, 14 and 16 connected in circuit relation to an infinite bus 18. As illustrated, the generators 10 and 12 are connected to a three-phase infinite bus 18 and the generators 14 and 16 are connected to a three-phase station bus 20 by means of conductors 15 and 17 respectively, the bus 20 being connected to the infinite bus 18. A plurality of loads represented by the rectangles 22 and 24 are also electrically connected to the infinite bus 18, the load 24 being connected to the bus 18 by means of a tie-line 23 and a transformer 25. The load 24 may consist of a base load formed by lighting circuits (not shown) and surge loads (not shown) such as may be caused by billets striking the rolls in a rolling mill. Although only the above generators and loads have been shown, it is to be understood that any number of generators and loads could be connected to the bus 18.

The output of the generators 14 and 16 is normally sufficient to meet the demands of the load 24. However, if these two generators 14 and 16 are unable to supply the load demand, the load 24 is so connected through transformer 25 that it can receive power from the infinite bus 18. The generators 14 and 16 are also so connected through transformer 27 to the infinite bus that in case their power supply is greater than the demand of the load 24, this excess power will be fed to the infinite bus 18.

In order to isolate the load 24 so that its fluctuations only affect the outputs of generators 14 and 16 and not the outputs of the generators 10 and 12, a regulating system embodying the teachings of this invention is provided. This regulating system comprises a load division network 26 the voltage input of which is responsive to the fluctuating load 24, two comparative circuits represented by the dot-dash rectangles 28 and 30 which are responsive to the output of the load division network 26, class A push-pull amplifiers represented by the rectangles 32 and 34 and which are responsive to the outputs of the comparative circuits 28 and 30, respectively, and control means represented by the rectangles 35 and 40. The control means 35 is associated with the amplifier 34 and includes a valve actuating electromagnet 36 responsive to the output of the amplifier 34 for controlling the output of a turbine 38 and thus the output of the generator 16. The control means 40 is associated with the amplifier 32 and is employed for controlling the output of the generator 14.

The generator 16 is controlled by means of the comparative circuit 30, the amplifier 34, the valve actuating electromagnet 36 and the turbine 38. The comparative circuit 28, the amplifier 32 and the control means 40 provided for controlling the generator 14 are identical to the corresponding components associated with the generator 16. Since the components of the control circuits are identical, in order to simplify the description, only that apparatus for controlling the generator 16 will be hereinafter described.

The load division network 26 is provided in order that the load 24 or a portion of it may be divided between the generators 14 and 16 and it comprises a resistance member 44 having an adjustable contact member 46 and resistance members 47 and 48 having slidable contact members 49 and 50, respectively. The slidable contact member 46 makes electrical contact with the resistance member 44 and is so disposed as to vary the amount of the load 24 supplied by each of the generators 14 and 16. In order to vary the amount of the load 24 that the generators 14 and 16 combined supply, the slidable contact members 49 and 50 are disposed to be adjusted to obtain a measure or predetermined proportion of the total load as measured across the resistor 44.

The reason for taking only a proportion of the total load 24 is that in actual practice the total load 24 comprises a basic load plus a fluctuating load which total load is supplied from not only the generators 14 and 16 but from other load regulated generators (not shown). In most instances, the other load regulated generators supply at least a part of the fluctuating load so that the generators 14 and 16 may conceivably supply the basic load plus the remainder of the fluctuating load. When it has been determined what proportion of the load 24 is to be supplied by the generators 14 and 16, then a measure of that proportion can be obtained by adjusting the slidable contact members 49 and 50 to obtain a measure of the proportion of the total load as impressed upon the resistance member 44.

In order to obtain a measure of the load 24 across the resistor 44, the load division network 26 is connected through a current transformer 51 which is associated with one of the conductors of the tie-line 23. It is assumed there is balance between the three phases of tie-line 23 and therefore single phase measurement gives a true indication of the load 24.

The comparative circuit 30 comprises two power measuring rectifier circuits 52 and 54 disposed to receive alternating-current signals that constitute a measure of the load 24 and alternating-current signals that constitute a measure of the power output of the generator 16, respectively. The power measuring circuit 52 is so disposed as to produce at its output a direct-current voltage that is a measure of the load 24 and the power measuring circuit 54 is so disposed as to produce at its output a direct current voltage that is a measure of the power output 34 of the generator 16. The voltages produced at the outputs of the load measuring circuits 52 and 54 are combined and their difference voltage applied to the amplifier 34.

The power measuring circuit 52 comprises a transformer 56 having a primary winding 58 and a split secondary winding having sections 60 and 62. In order to convert the output of the transformer 56 to provide a direct current measure thereof, rectifier tubes 64 and 66 having anodes 67 and 71, respectively, and cathodes 69 and 73, respectively, are provided. A transformer 68 is provided which has a primary winding 70 that is electrically connected through a potential transformer 114 to the station bus 20 so as to obtain a reference voltage and a secondary winding 72 which is disposed to render the tubes 64 and 66 conductive every half cycle.

In order to obtain an anode-cathode voltage for the tube 66, one end of the secondary winding 72 of the transformer 68 is electrically connected through the secondary winding section 62 of the transformer 56 to the anode 71 of the rectifier tube 66 and the other end of the secondary winding 72 is electrically connected through a resistance member 74 to the cathode 73 of the rectifier tube 66. On the other hand, in order to obtain an anode-cathode voltage for the tube 64, one end of the secondary winding 72 is electrically connected through a resistance member 76, a slidable contact member 77 and the secondary winding section 60 of the transformer 56 to the anode 67 of the rectifier tube 64, the other end of the secondary winding 72 being electrically connected through a resistance member 78 to the cathode 69 of the rectifier tube 64.

The transformers 56 and 68 are so wound that when the voltage across the secondary winding 72 of the transformer 68 is additive to the voltage appearing across the secondary winding section 62 of the transformer 56, the voltage appearing across the secondary winding section 60 of the transformer 56 is subtractive from the voltage appearing across the secondary winding 72. As in usual practice, the output of the power measuring circuit 52 is filtered by means of a capacitor 80 and is connected to the input of the amplifier 34 and one side of the output of the power measuring circuit 54 by means of conductors 82 and 84, respectively, the other side of the output of the rectifier circuit 54 being electrically connected to the input of the amplifier 34 by means of conductor 85.

The power measuring circuit 54 is connected to be supplied by a measure of the output current of the generator 16 which is obtained by means of a current transformer 86 associated with one of the three line conductors 17 from the generator 16. The power measuring circuit 54 comprises a potential transformer 88 having a primary winding 90 and secondary winding sections 92 and 94, the primary winding 90 being electrically connected to the current transformer 86. In order to rectify the alternating-current appearing across the secondary winding of the transformer 88, rectifier tubes 96 and 98 having anodes 100 and 102, respectively, and cathodes 104 and 106, respectively, are provided. The power measuring circuit 54 is also provided with a voltage transformer 108 having a primary winding 110 and a secondary winding 112, the primary winding being electrically connected to a reference voltage on the station bus 20 through the voltage transformer 114.

The anode-cathode voltage for the rectifier tube 96 is obtained by electrically connecting one end of the secondary winding 112 of the transformer 108 through the secondary winding section 92 of the transformer 88 to the anode 100 of the tube 96 and by electrically connecting the other end of the secondary winding 112 through a resistance member 116 to the cathode 104. In order to secure an anode-cathode voltage for the rectifier tube 98, one end of the secondary winding 112 is electrically connected through the secondary winding section 94 to the anode 102 of the rectifier tube 98 and the other end of the secondary winding 112 is electrically connected through a resistance member 118 to the cathode 106.

The output voltage of the power measuring circuit 54 is filtered by means of a capacitor 120 and this filtered output voltage is combined with the filtered output voltage from the power measuring circuit 52 and the difference voltage is applied to the amplifier 34.

As hereinbefore mentioned, a valve actuating electromagnet 36 is responsive to the output of the amplifier 34 and is disposed to actuate a steam valve mechanism 122 through a suitable hydraulic servo mechanism 124. The steam valve mechanism 122 controls the steam input to the turbine 38 to thus vary the output of the generator 16.

The valve actuating electromagnet 36 comprises energizing windings 126 and 128 disposed around magnetic core members 130 and 132, respectively, the core members having air gaps therein and being so disposed that the air gaps are adjacent each other. As shown, the energizing windings 126 and 128 are disposed to be connected through a two-pole double-throw switch 134 to the output of the amplifier 34. Disposed in the open air gap of the core members 130 and 132 is a movable armature member 135 which is pivoted about a fulcrum 136 so as to directly actuate the control pressure of the hydraulic servo mechanism 124 to thus increase or decrease the steam input to the turbine 38, depending upon the magnitude of the current flow through the energizing windings 126 and 128.

In some cases, the boiler (not shown) for the turbine will have certain mechanical limitations. For instance, the turbine may only be able to increase its output a predetermined amount rapidly without injuring the boiler. Thus it is necessary in order to prevent an injury to the boiler to provide adjustable mechanical limits to restrict the movement of the turbine steam inlet valve (not shown) with respect to its valve seat. This is accomplished by means of a suitable linkage system (not shown) which forms a part of the hydraulic servo mechanism 124. As the base portion of the load 24 gradually changes, it is necessary to gradually change the mechanical limits for the steam inlet valve otherwise the valve will be too restricted in its movement when a relatively fast acting surge in the load 24 occurs and the generator 16 will thus be prevented from absorbing the surge load. As illustrated, an integrating motor 138, having an armature 140 and forward and reverse field windings 142 and 144, respectively, is provided for changing the mechanical limits for the steam inlet valve. The motor 138 is mechanically connected to the hydraulic servo mechanism 124 and is so disposed as to respond to any semi-permanent change in the output voltage of the amplifier 34.

In order to effect an actuation of the slidable contact member 77 of the resistor 76 of the power measuring circuit 52, a motor 146 is mechanically connected thereto. The motor 146 comprises an armature 148 and forward and reverse field windings 150 and 152, respectively. The operation of the motor 146 will be hereinafter described.

As illustrated, a single-pole double-throw switch 154 is provided so as to selectively connect either the armature 140 of the motor 138 or the armature 148 of the motor 146 to a positive source of potential 156.

In order that the motor 138 or the motor 146, depending upon the position of the switch 154, will be energized in accordance with the polarity of the output of the amplifier 34, a polarized relay 158 is provided. The relay 158 comprises an energizing winding 159 which is electrically connected across the output of the amplifier 34, a movable armature member 160, and an electrically conducting rod member 162 connected to one end of the movable armature 160 and pivoted about a fulcrum 164. The rod member 162 is connected to a suitable negative source of potential 166. A movable contact member 168 is connected to one end of the rod member 162, the movable contact member 168 being disposed to selectively engage opposed stationary contact members 170 and 172.

As hereinbefore mentioned, the relay 158 is provided so that the motors 138 and 146 may be actuated in accordance with the polarity of the output of the amplifier 34 depending on the position of the switch 154. With a predetermined polarity across the output of the amplifier 34, the movable contact member 168 of the relay 158 will be actuated into circuit engagement with the stationary contact member 170. With the switch 154 in the downward position, an energizing circuit will be completed to the armature 140 of the motor 138, thus, effecting an actuation of the hydraulic servo mechanism 124 to lower the output of the generator 16. This energizing circuit extends from the negative source of potential 166 through the rod member 162 of the relay 158, the movable contact member 168, the stationary contact member 170, the reverse field winding 144 of the motor 138, the armature 140, and switch 154 to the positive source of potential 156.

When the polarity across the output of the amplifier 34 reverses, the movable contact member 168 of the relay 158 will be actuated into circuit closing position with the stationary contact member 172, thus completing an energizing circuit to the forward field winding of the motor 138 effecting an actuation of the hydraulic servo mechanism 124 to increase the output of the generator 16. This energizing circuit extends from the negative source of potential 166, the rod member 162 of the relay 158, the movable contact member 168, the stationary contact member 172, the forward field winding 142 of the motor 138, the armature 140, and the switch 154 to the positive source of potential 156.

When there is sufficient demand from the loads other than load 24 that are connected to the infinite bus 18, it is desirable to operate the generator 16 at a maximum output in order to obtain as high an efficiency for the generator as possible. This high efficiency is obtained by actuating the slidable contact member 77 by means of the motor 146 which is mechanically connected thereto when there is a change in the base load of the load 24. For instance, when the base part of the load 24 decreases, the output of the power measuring circuit 52 likewise decreases and in order to offset this decrease and thus effect a maximum output of the generator 16, the movable contact member 77 must be actuated downward so as to increase the portion of resistor 76 in the anode-cathode circuit to decrease the anode-cathode voltage of the rectifier tube 64. Thus, the motor 146 is so disposed that it will actuate the slidable contact member 77 to increase or decrease the anode-cathode voltage of the rectifier tube 64 and thus decrease or increase the output voltage of the rectifier circuit 52 depending on the polarity of the output voltage of the amplifier 34.

With the switch 154 in the upper position, and a predetermined polarity across the output of the amplifier 34, the movable contact member 168 of the relay 158 will be actuated into circuit engagement with the stationary contact member 170 to thus complete an energizing circuit to the reverse field winding 152 of the motor 146. This energizing circuit extends from the positive source of potential 156 through switch 154, the armature 148 of the motor 146, the reverse field winding 152 of the motor 146, the stationary contact 170 of the relay 158, the movable contact member 168 and the rod member 162 to the negative source of potential 166.

When the polarity across the output of the amplifier 34 reverses, the movable contact member 168 will be actuated into engagement with the stationary contact member 172 thus completing an energizing circuit through the forward field winding 150 of the motor 146 to cause a forward rotation of the motor. This energizing circuit extends from the positive source of potential 156 through the switch 154, the armature 148 of the motor 146, the forward field winding 150 of the motor 146, the stationary contact member 172 of the relay 158, the movable contact member 168, and the rod member 162 to the negative source of potential 166.

In practice, it is necessary to make certain adjustments when the regulating system is initially operated. For instance, the apparatus should be adjusted until the voltage output of the amplifier 34 is at zero magnitude. A null meter 173 is utilized in determining when the output of the amplifier 34 is at such a zero value.

The adjustments necessary in obtaining a zero output voltage from the amplifier 34 are as follows. The switch 134 is actuated until it is in the position as shown in the drawing in which the resistance members 174 and 176 are electrically connected to the output of the amplifier 34. The switch 154 is then actuated to the position as shown in the drawing in which the positive source of potential 156 is electrically connected to the armature 148 of the motor 146. With the switches 134 and 154 so positioned, the motor 146 will be rotated in one direction or the other, depending on the polarity of the output voltage of the amplifier 34. The motor 146 will continue to rotate and thus actuate the slidable contact member 77 until the slidable contact member is so positioned with respect to the resistance member 76 that the output voltage from the power measuring circuit 52 is equal in magnitude to the output voltage from the power measuring circuit 54 to thus secure zero output voltage from the amplifier 34. When zero output voltage of the amplifier 34 is obtained, the relay 158 will be in its neutral position, the negative source of potential 166 will be disconnected from the field windings 150 and 152 of the motor 146, and the slidable contact member 77 will assume a stationary position with respect to the resistance member 76.

For normal operation, the switch 134 is actuated into the downward position so as to electrically connect the energizing windings 126 and 128 of the valve actuating electromagnet 36 to the output of the amplifier 34. The switch 154 may be either actuated in the upward or downward position so as to electrically connect either the armature 148 of the motor 146 or the armature 140 of the motor 138 to the positive source of potential 156. Whether the switch 154 should be positioned in the upward or downward position depends upon the magnitude of the load 24 as well as the demands of the other loads that are connected to the infinite bus 18. When the demand of the other loads is small, the switch 154 should be actuated into the downward position so that the base load of generator 16 will match the base load on tie line 23 and when the demand of these loads is great, then the switch 154 should be actuated into the upward position so that the base load generator 16 will be held essentially constant regardless of changes of the base load on tie line 23.

In operation when there is an increase or decrease in the load 24 there is an increase or decrease in the load current flowing in the tie-line 23. A rise in the magnitude of the load current flowing in the tie-line 23 increases the current flow through the current transformer 51 and thus the current flow through the resistance member 44 of the load division network 26. The increased current flow through the resistance member 44 increases the voltage across this member which voltage causes an increased current flow through the primary winding section 58 of the transformer 56. The magnitude of this current flow through the primary winding 58 depends on the relative position of the slidable contact member 48 with respect to the resistance member 44 as well as the position of the slidable contact member 50 with respect to the resistance member 46.

The secondary winding section 62 of the transformer 56 is so wound upon its core member that the end of the section that is connected to the anode 71 of the rectifier tube 66 is always at a positive potential when the end of the secondary winding 72 of the transformer 68 that is connected to the section 62 is at a positive potential. However, the end of the secondary winding section 60 of the transformer 56 that is connected to the resistance member 76 is always at a positive potential when the secondary winding section 62 and the secnodary winding 72 have have the polarities hereinbefore mentioned. Thus, when the end of the secondary winding 72 that is connected to the section 62 is at a positive potential, the rectifier tube 66 will have a greater conductivity than the conductivity of the rectifier tube 64. This is because the voltages across the secondary winding 72 and the secondary winding section 62, which form the anode-cathode potential for the rectifier tube 66, are additive. However, the voltages across the secondary winding 72 and the secondary winding section 60, which form the anode-cathode potential for the rectifier tube 64, are subtractive. Since the conductivity, when the hereinbefore mentioned conditions exist, is greater through the rectifier tube 66 than through the rectifier tube 64, the end of the resistance member 74 that is connected to the cathode 73 of the rectflier tube 66 will always be at a positive potential with respect to the end of the resistance member 78 that is connected to the cathode 69 of the rectifier tube 64.

It is to be noted that, when the end of the secondary winding 72 of the transformer 68 that is connected to the section 62 of the transformer 56 is at a negative potential, neither the rectifier tube 64 nor the rectifier tube 66 will be conducting. In all cases, the capacitor 80 filters the output of the power measuring circuit 52 and the resulting output voltage is substantially a uniform direct-current voltage.

The output from the power measuring circuit 54, which output is combined with the output from the power measuring circuit 52, is determined by the magnitude of the current flow through the line conductors 17. A measure of this current flows through the current transformer 86 and likewise through the primary winding 90 of the transformer 88. The secondary winding sections 92 and 94 of the transformer 88 are so wound that when the end of the secondary winding 112 of the transformer 108 that is connected to the secondary winding sections 92 and 94 is at a positive potential, the end of the secondary winding section 94 that is connected to the anode 102 of the rectifier 98 will be at a negative potential. However, when the secondary winding 112 has a potential as hereinbefore mentioned, the end of the secondary winding section 92 that is connected to the anode 100 of the rectifier tube 96 will be at a positive potential. Therefore, the anode-cathode voltage for the rectifier tube 96, which is formed by the voltages across the secondary winding 112 and the secondary winding section 92, will be greater than the anode-cathode voltage for the rectifier tube 98, which anode-cathode potential is formed by the voltages appearing across the secondary winding 112 and the secondary winding section 94. Since the anode-cathode voltage for the rectifier tube 96 is greater than that voltage for the rectifier tube 98, the conductivity will be greater through the rectifier tube 96. This means that the end of the resistance member 116 that is connected to the cathode 104 of the rectifier tube 96 will always be at a positive potential with respect to the end of the resistance member 118 that is connected to the cathode 106 of the rectifier tube 98 when the polarity across the secondary winding 112 is as hereinbefore mentioned.

When the end of the secondary winding 112 of the transformer 108 that is connected to the secondary winding sections 92 and 94 of the transformer 88 is at a negative potential, neither the rectifier tube 96 nor the rectifier tube 98 will be conducting.

The polarities of the output voltages of the power measuring circuits 52 and 54 are such that they are subtractive one from the other and this difference voltage is applied to the input to the amplifier 34. When there is an increase in the load 24, the output voltage from the power measuring circuit 52 is momentarily greater than the output voltage from the power measuring circuit 54. This effects a greater flow of current through the energizing winding 126 than through the energizing winding 128 of the valve actuating electromagnet 36 to effect a movement of the armature 135 of the valve actuating electromagnet 36 in the upward direction to actuate the hydraulic servo mechanism 124 and the steam valve mechanism 122 to emit a greater amount of steam to the turbine 38. This increased steam to the turbine 38 increases the output of the generator 16 to supply the demands of the load 24 until the output from the generator 16 causes the output from the power measuring circuit 54 to increase to a value that is equal in magnitude to that voltage output from the power measuring circuit 52. When this latter condition exists, the regulating system is in equilibrium.

If, however, the output voltage from the power measuring circuit 54 is greater than the output voltage from the power measuring circuit 52, the current flow through the operating coil 128 of the valve actuating electromagnet 36 will be greater than that current flow through the operating coil 126. Under such conditions the armature member 135 will be actuated downwardly to effect an operation of the hydraulic servo mechanism 124 and consequently the steam valve mechanism 122 to decrease the steam input to the turbine 38. This will effect a lowering of the output of the generator 16 to thus again return the output voltage of the power measuring circuit 54 to a value equal in magnitude to the output voltage of the power measuring circuit 52.

It is to be noted that the control apparatus for the generator 14 comprising the comparative circuit 28, the amplifier 32, and the control means 40 functions in the same manner to supply the demands of the load 24 as does the corresponding control apparatus for the generator 16, this corresponding control apparatus comprising the comparative circuit 30, the amplifier 34, and the control means 35.

The apparatus embodying the teachings of this invention has several advantages. Among these advantages is the fact that the regulating system has a high speed of response and thus good regulating qualities.

We claim as our invention:

1. In a system having a plurality of loads connected to an infinite bus disposed to be supplied by a plurality of generators, the combination comprising, means for obtaining a measure of one of said loads, said one load being subject to fluctuating surges, means for obtaining a measure of the output of one of said generators, means responsive to said two measuring means for providing a measure of the differential between the load measure and the generator output measure to provide a control voltage, an amplifier responsive to the control voltage, and control means comprising a valve actuating electromagnet responsive to the amplifier and disposed to control the operation of said one of the generators.

2. In a system having a plurality of loads connected to an infinite bus disposed to be supplied by a plurality of generators, the combination comprising, means for obtaining a measure of one of said loads, said one load being subject to fluctuating surges, means for obtaining the measure of the output of one of said generators, a load division network responsive to the means for obtaining a measure of one of said loads, a comparative circuit responsive to the load division network and to said measure of the output of one of said generators, the comparative circuit being so disposed as to produce a control voltage that is a measure of the difference between the said measure of one of said loads and the said measure of the output of one of said generators, means for obtaining a measure of the output of another of the generators, another comparative circuit responsive to the load division network and to a measure of the output of said another generator, the said another comparative circuit being so disposed as to produce a control voltage that is a measure of the difference between the said measure of one of said loads and the measure of the output of said another generator, and control means comprising a valve actuating electromagnet associated with each of the comparative circuits and responsive to the output therefrom for controlling the operation of the said two generators so as to increase or decrease their output.

3. In a system having a plurality of loads connected to an infinite bus disposed to be supplied by a plurality of generators, the combination comprising, means for obtaining a measure of at least one of said loads, said one load being subject to fluctuating surges, means for obtaining a measure of the output of at least one of said generators, a rectifier circuit responsive to the means for obtaining a measure of at least one of said loads, another rectifier circuit responsive to the means for obtaining a measure of the output of at least one of said generators, circuit means electrically connected to the two rectifier circuits for obtaining a control voltage that is the difference between the voltage outputs of the two rectifier circuits, and means comprising a valve actuating electromagnet responsive to the control voltage and disposed to control the operation of said one of the generators.

4. In a system having a plurality of loads connected to an infinite bus disposed to be supplied by a plurality of generators, the combination comprising, means for obtaining a measure of at least one of said loads, said one load being subject to fluctuating surges, means for obtaining a measure of the output of at least one of said generators, a rectifier circuit responsive to the means for obtaining a measure of at least one of said loads, a motor disposed to be operated to control the output of the said rectifier circuit, another rectifier circuit responsive to the means for obtaining a measure of the output of at least one of said generators, circuit means electrically connected to the two rectifier circuits for obtaining a control voltage that is the difference between the voltage outputs of the two rectifier circuits, an amplifier responsive to said control voltage, and control means comprising a valve actuating electromagnet responsive to the amplifier and disposed to control the operation of said one of the generators, said control means including means for controlling the operation of the motor.

5. In a system having a plurality of loads connected to an infinite bus disposed to be supplied by a plurality of turbine driven generators, the combination comprising, means for obtaining a measure of one of said loads, said one load being subject to fluctuating surges, means for obtaining a measure of the output of one of said turbine driven generators, means responsive to said two means for providing a measure of the differential between the load measure and the generator output measure to provide a control voltage of predetermined polarity, and control means responsive to the control voltage disposed to control the operation of said one of the turbine driven generators to supply said one of the loads, said control means comprising an actuating electromagnet responsive to said control voltage for controlling the operation of the turbine and generator driven thereby, and an integrating motor disposed to be responsive to said control voltage so as to vary said measure of the differential to thus increase or decrease the output of the said one of the turbine driven generators.

6. In a system having a plurality of loads connected to an infinite bus disposed to be supplied by a plurality of turbine driven generators, the combination comprising, means for obtaining a measure of at least one of said loads, said one load being subject to fluctuating surges, means for obtaining a measure of the output of at least one of said generators, an electronic half-wave rectifier responsive to the means for obtaining a measure of at least one of said loads, another electronic half-wave rectifier responsive to the means for obtaining a measure of the output of at least one of said generators, circuit means for connecting the outputs of the said two rectifiers so as to obtain a control voltage that is a measure of the difference between the said measure of at least one of said loads and the said measure of th output of at least one of said generators, a balanced push-pull amplifier responsive to said control voltage, an actuating electromagnet responsive to the output of the amplifier for controlling the steam input to the operation of the turbine and generator driven thereby, two integrating motors disposed to be selectively energized for selectively varying the output of the load measuring rectifier and the operation of the turbine driving said one generator, and a relay responsive to the output of the amplifier for controlling the operation of the selected motor.

7. In a system having a plurality of loads connected to an infinite bus disposed to be supplied by a plurality of generators, the combination comprising, means for obtaining a measure of one of said loads, said one load being subject to fluctuating surges, means for obtaining a measure of the output of one of said generators, a rectifier responsive to the means for obtaining a measure of one of said loads, the said rectifier comprising two rectifier tubes, control means for rendering the two rectifier tubes conductive every half cycle, and filter means for filtering the output of the rectifier, another rectifier responsive to the said means for obtaining a measure of the output of one of said generators, the said another rectifier comprising two other rectifier tubes, another control means for rendering the said two other rectifier tubes conductive every half cycle, and another filter means for filtering the output of said another rectifier, circuit means for connecting together the outputs of the said two rectifiers to obtain a control voltage that is a measure of the difference between the outputs of the two said rectifiers, a push-pull amplifier responsive to said control voltage, and operating means comprising a valve actuating electromagnet responsive to said push-pull amplifier and so disposed as to control the operation of said one of the generators to supply said one of the loads.

8. In a system having a plurality of loads connected to an infinite bus disposed to be supplied by a plurality of turbine driven generators, the combination comprising, means for obtaining a measure of one of said loads, said one load being subject to fluctuating surges, means for obtaining a measure of the output of one of said turbine driven generators, a rectifier responsive to the means for obtaining a measure of one of said loads, the said rectifier comprising two rectifier tubes, control means for rendering the two rectifier tubes conductive every half cycle, and filter means for filtering the output of the rectifier, another rectifier responsive to the said means for obtaining a measure of the output of one of said generators, the said another rectifier comprising two other rectifier tubes, another control means for rendering the said two other rectifier tubes conductive every half cycle, and another filter means for filtering the output of said another rectifier, circuit means for connecting together the outputs of the said two rectifiers to obtain a control voltage that is a measure of the difference between the outputs of the two said rectifiers, a push-pull amplifier responsive to said control voltage, an actuating electromagnet responsive to the output of the amplifier for controlling the operation of the turbine and generator driven thereby, two integrating motors disposed to be selectively energized for selectively varying the output of the load measuring rectifier and the operation of the turbine driving said one generator, and a relay responsive to the output of the amplifier for controlling the operation of the selected motor.

SEYMOUR W. HERWALD.
HAROLD M. WATSON.

REFERENCES CITED

The following references are of record in the file of this patent:

UNITED STATES PATENTS

| Number | Name | Date |
|---|---|---|
| 1,457,052 | Birch | May 29, 1923 |
| 1,824,692 | Skinkle | Sept. 22, 1931 |
| 1,863,302 | Geiselman | June 14, 1932 |
| 1,907,517 | De Camp | May 9, 1933 |
| 1,984,187 | Hayward et al. | Dec. 11, 1934 |
| 2,015,555 | Fountain | Sept. 24, 1935 |
| 2,504,768 | Watson et al. | Apr. 18, 1950 |
| 2,558,729 | Buechler | July 3, 1951 |